(12) United States Patent
Edder et al.

(10) Patent No.: US 10,910,159 B2
(45) Date of Patent: Feb. 2, 2021

(54) EDDER COMPOUND AND CAPACITOR THEREOF

(71) Applicant: CAPACITOR SCIENCES INCORPORATED, Menlo Park, CA (US)

(72) Inventors: Carine Edder, San Carlos, CA (US); Pavel Ivan Lazarev, Menlo Park, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 0 days.

(21) Appl. No.: 16/509,956

(22) Filed: Jul. 12, 2019

(65) Prior Publication Data

US 2020/0006000 A1    Jan. 2, 2020

Related U.S. Application Data

(63) Continuation of application No. 15/844,364, filed on Dec. 15, 2017, now Pat. No. 10,403,435.

(51) Int. Cl.

| | |
|---|---|
| *H01G 4/18* | (2006.01) |
| *C08F 20/18* | (2006.01) |
| *C08G 69/08* | (2006.01) |
| *C08G 69/32* | (2006.01) |
| *H01G 4/005* | (2006.01) |

(52) U.S. Cl.
CPC ............... *H01G 4/18* (2013.01); *C08F 20/18* (2013.01); *C08G 69/08* (2013.01); *C08G 69/32* (2013.01); *H01G 4/005* (2013.01); *C08F 2500/02* (2013.01); *C08L 2203/20* (2013.01)

(58) Field of Classification Search
CPC .......... H01G 4/18; H01G 4/005; C08F 20/18; C08G 69/08; C08G 69/32
USPC ........................................................ 549/59
See application file for complete search history.

(56) References Cited

U.S. PATENT DOCUMENTS 10,403,435 B2 * 9/2019 Edder ................. H01G 4/18

OTHER PUBLICATIONS

Deruiter, J. Resonance and Induction Tutorial. Auburn University-Principles of Drug Action 1 Course Material. Spring 2005, 19 pages. (Year: 2005).*
Dorwold, FZ. Side Reactions in Organic Synthesis. Wiley. 2005, preface and chapter 1, 32 pages. (Year: 2005).*
Holliday; Progress in Polymer Science 2017, 70, 34-51. (Year: 2017).*
Shi; RSC Adv., 2015, 5, 96328-96335. (Year: 2015).*
Laiho; Macromolecules 2013, 46, 4548-4557. (Year: 2013).*
Ng; J. Mater. Chem. 1998, 8, 2347-2352. (Year: 1998).*
Page; ACS Cent. Sci. 2017, 3, 654-66. (Year: 2017).*
Qiao; Adv. Funct. Mater. 2013, 23, 5638-5646, with supporting information, 15 pages. (Year: 2013).*
Qiao; Polymer 2015, 72, 428-435. (Year: 2015).*
Yoon; Macromolecules 2008, 41, 8778-8784. (Year: 2008).*
Notice of references. Carcanague and dated Mar. 13, 2019 in U.S. Appl. No. 15/844,364.
Information Disclosure Statement by Applicant submitted on Jan. 18, 2019 in U.S. Appl. No. 15/844,364.
Notice of references dated Oct. 9, 2018 in U.S. Appl. No. 15/844,364.

* cited by examiner

*Primary Examiner* — Daniel R Carcanague
(74) *Attorney, Agent, or Firm* — BCF LLP

(57) ABSTRACT

A metadielectric composite oligomeric organic material according to the formula:

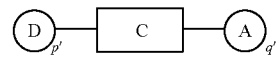

wherein C is a linear chain oligomeric polarizable core with a system of conjugated multiple and single bonds wherein the linear chain oligomeric polarizable core possesses at least two different monomers with differing electron affinity, and the different monomers are positioned within the linear chain oligomeric polarizable core such that an electron affinity gradient is present, and the differing monomers have a low HOMO-LUMO bandgap between them, and there is at least one electron-donor group, D, attached to the linear chain oligomeric polarizable core, there is at least one electron-acceptor group, A, is attached to the linear chain oligomeric polarizable core, p' and q' represent the number of electron-donor and electron-acceptor groups present, respectively, and are any integer greater than zero, and at least one resistive insulating group is covalently attached to the molecular structure at any location.

8 Claims, 2 Drawing Sheets

EDDER COMPOUND AND CAPACITOR THEREOF

FIELD OF THE INVENTION

The present disclosure relates generally to passive components of electrical circuits and more particularly to a composite organic compound and capacitor based on this material and intended for energy storage.

BACKGROUND

A capacitor is a passive electronic component that is used to store energy in the form of an electrostatic field, and comprises a pair of electrodes separated by a dielectric layer. When a potential difference exists between the two electrodes, an electric field is present in the dielectric layer. An ideal capacitor is characterized by a single constant value of capacitance, which is a ratio of the electric charge on each electrode to the potential difference between them. For high voltage applications, much larger capacitors must be used.

One important characteristic of a dielectric material is its breakdown field. This corresponds to the value of electric field strength at which the material suffers a catastrophic failure and conducts electricity between the electrodes. For most capacitor geometries, the electric field in the dielectric can be approximated by the voltage between the two electrodes divided by the spacing between the electrodes, which is usually the thickness of the dielectric layer. Since the thickness is usually constant it is more common to refer to a breakdown voltage, rather than a breakdown field. There are a number of factors that can dramatically reduce the breakdown voltage. In particular, the geometry of the conductive electrodes is important factor affecting breakdown voltage for capacitor applications. In particular, sharp edges or points hugely increase the electric field strength locally and can lead to a local breakdown. Once a local breakdown starts at any point, the breakdown will quickly "trace" through the dielectric layer until it reaches the opposite electrode and causes a short circuit.

Breakdown of the dielectric layer usually occurs as follows. Intensity of an electric field becomes high enough to "pull" electrons from atoms of the dielectric material and makes them conduct an electric current from one electrode to another. Presence of impurities in the dielectric or imperfections of the dielectric structure can result in an avalanche breakdown as observed in semiconductor devices.

Another important characteristic of a dielectric material is its dielectric permittivity. Different types of dielectric materials are used for capacitors and include ceramics, polymer film, paper, and electrolytic capacitors of different kinds. The most widely used polymer film materials are polypropylene and polyester. Increasing dielectric permittivity while maintaining high resistivity allows for increasing volumetric energy density, which makes it an important technical task.

Capacitors as energy storage device have well-known advantages versus electrochemical energy storage, e.g. a battery. Compared to batteries, capacitors are able to store energy with very high power density, i.e. charge/recharge rates, have long shelf life with little degradation, and can be charged and discharged (cycled) hundreds of thousands or millions of times. However, capacitors often do not store energy in small volume or weight compared with batteries, or at low energy storage cost, which makes capacitors impractical for some applications, for example electric vehicles. Accordingly, it may be an advance in energy storage technology to provide capacitors of higher volumetric and mass energy storage density and lower cost.

A need exists to improve the energy density of film capacitors while maintaining the existing power output and durability or lifetime. There exists a further need to provide a capacitor featuring a high dielectric constant sustainable to high direct current (DC) voltages where the capacitance is voltage dependent. Such a capacitor is the subject of the present disclosure.

SUMMARY

Figure 1A:
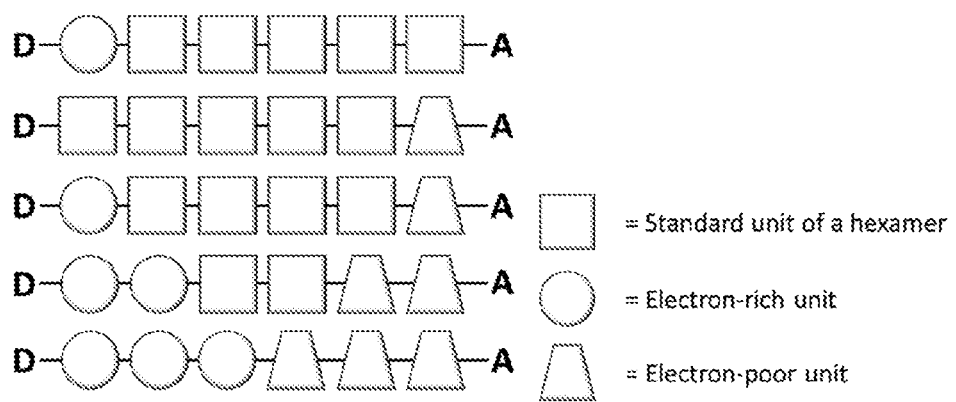
FIG. 1A illustrates how monomers of differing electron affinity can be incorporated into hexamers to result in oligomers with asymmetric electron affinity according to aspects of the present disclosure.

Aspects of the present disclosure include oligomeric dielectric materials. In general, these oligomeric dielectric materials are composite oligomeric organic materials comprised of a polarizable oligomer, at least one electron-donor group, at least one electron-acceptor group, and at least one insulating resistive group. The polarizable oligomer is made up of cyclic monomers with alternating double and single bonds, preferably heterocyclic monomers. At least one electron donor group and one electron acceptor group each are covalently attached to monomers within the oligomer, typically opposite terminal monomers, to further enhance polarizability. The insulating resistive group is present either as a side chain on a monomer within the polarizable oligomer, or attached to or incorporated as part of the electron donor or electron acceptor.

Another aspect of the present disclosure is to provide a capacitor with high energy storage. A still further aspect of the present disclosure is to provide a capacitor featuring non-linear voltage dependent capacitance. In yet another aspect of the present disclosure, a method to make such a capacitor is provided.

The capacitor, in its simplest form, comprises a first electrode, a second electrode and a dielectric material containing a dielectric composite oligomer comprised of a polarizable unit, at least one insulating resistive group, at least one electron-donor, at least one electron-acceptor, and at least one resistive insulating group, between the first electrode and the second electrode. The polarizable oligomer is comprised of cyclic monomers, preferably heterocyclic monomers, that are connected via single bonds, double bonds, or linker units such as —C≡C—, —N═N—, —C═N—, and acetylene, provided the conjugated system is maintained allowing for delocalization of electrons over the length of the oligomer. The polarizable oligomer has at least one electron-donor and one electron-acceptor. These groups are preferentially placed at opposite ends of the polarizable oligomer. Among the many types of insulating resistive groups that may be present in the composite oligomer, alkyl chains, branched alkyl chains, fluorinated alkyl chains, branched fluoroalkyl chains, poly(methyl methacrylate) chains are examples and are preferentially positioned on the terminal monomers of the polarizable oligomer or as part of the electron-donor or electron-acceptor groups. When a bias is applied across the first and second electrodes, the composite oligomer becomes more or less polarized with electron density moving to compensate the field induced by the applied bias. When the bias is removed, the original charge distribution is restored, discharging the capacitor and releasing stored electrical potential energy in the form of an electric current.

Note on Nomenclature

The terms oligomer and polymer are sometimes used interchangeably. However, oligomer herein is used to describe a linear molecule of repeating structural motifs with short backbone length (low molecular weight). By way of example, and not by way of limitation, oligomer may refer to a linear molecule consisting of a defined number of similar or different monomers (cyclic units), e.g., at least three of them. Polymer is more commonly used to refer to a molecule of repeating structural motifs with a long backbone length. The distinction between the two is described herein to be less than 10 repeats for oligomers and 10 or more repeats for polymers.

The term "film" generally refers to a configuration of a composition of matter in the form of a layer of material in which a length or width of the layer is much greater than that of its thickness, e.g., 10 times greater or more. Since $C=\varepsilon A/d$, the greater the ratio the better. However, for smaller devices, it is conceivable to have smaller ratios such as ratio of 10:1. These are more related to the form factor, available space, and application of the end device. However, for metadielectrics, permittivity has more significant impact on capacitance when compared to film capacitors with similar form factors that have permittivity of 1-5 versus a metacapacitor, for example, with a permittivity of 10K. Typical film capacitors used in electronics range from 100 picoF to microF capacitances. Therefore, a 10:1 structure is a feasible option.

DETAILED DESCRIPTION

According to aspects of the present disclosure an energy storage device, such as a capacitor, includes a composite oligomeric organic material of any of the types described herein sandwiched between first and second electrodes. The electrodes may be made conductors. Conductors include, but are not limited to, metals, conducting polymers, carbon nano-materials, and graphite including graphene sheets. The electrode may or may not be formed on a support layer. Flat layers may include, but are not limited to, glass, plastic, silicon, and metal surfaces.

Introduction

One major novel aspect of the present invention is the use of at least one meta-capacitor. A meta-capacitor is a dielectric film capacitor whose dielectric film is a meta-dielectric material layer, which is disposed between a first electrode and a second electrode. A meta-dielectric material is described below. Meta-capacitors have greater energy storage capacity than conventional thin film capacitors and ultracapacitors or supercapacitors. Unlike rechargeable batteries, capacitors, including meta-capacitors, can be charged relatively quickly, can be deeply discharged without suffering damage, and can undergo large numbers of charge and discharge cycles without damage.

A meta-dielectric material is defined here as a dielectric comprised of one or more types of materials having a relative permittivity greater than or equal to 1000 and resistivity greater than or equal to $10^{14}$ Ohm·cm. Further, meta-dielectrics are composite materials which incorporate an envelope of insulating resistive groups that electrically isolate any supramolecular structures formed from each other in the dielectric layer and provide high breakdown voltage of the energy storage molecular material.

Oligomeric Dielectric Materials

Oligomeric dielectric materials are composite oligomeric organic materials comprised of polarizable oligomers, at least one electron-donor, at least one electron-acceptor, and at least one insulating or resistive group. The polarizable oligomer is made up of cyclic monomers with conjugated bonds. In this application, conjugated bonds refer to any system of alternating single bonds with double or triple bonds, referred to jointly as multiple bonds. At least one electron-donor group and one electron-acceptor group are covalently attached to monomers within the oligomer, preferably opposite terminal monomers, to further enhance polarizability. The insulating resistive group may be attached to a monomer as a side chain on the polarizable oligomer, or the insulating resistive group may be attached to or be part of the electron donor or electron acceptor.

The polarizable oligomer is a linear chain of cyclic monomers joined by single bonds, double bonds, —C═C—, —C═N—, —N═N—, or acetylene, provided the alternating system of single bonds and multiple bonds is maintained throughout the length of the chain. A key feature of the polarizable core is that it possesses a gradient of electron affinity where some of the comprising monomers have differing electron affinity in a direction specific manner. Gradient in this application is defined such that one end of the oligomer has greater electron affinity than the other end. As such, the oligomer needs to contain at least two different monomers of differing electron affinity and the placement of the two monomers within the oligomer results in an asymmetry of electron affinity. The monomers used to make the oligomers may be any carbocycle or heterocycle that upon coupling results in a conjugated system of alternating multiple and single bonds throughout the oligomer. Known monomers that meet these features are described by the following table of formulae, but should not be interpreted to limit the embodiments of the invention.

| TABLE A MONOMERS | |
|---|---|
| A |  |
| B | 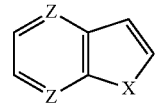 |

TABLE A MONOMERS
C 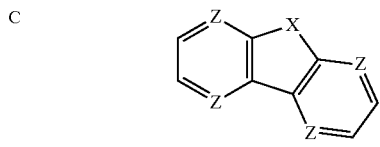
D 
E 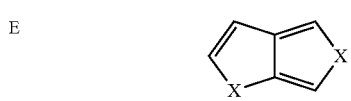
F 
G 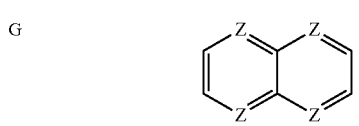
H 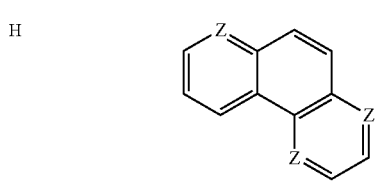
I 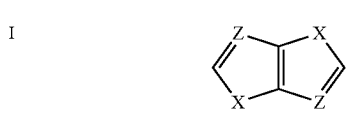
J 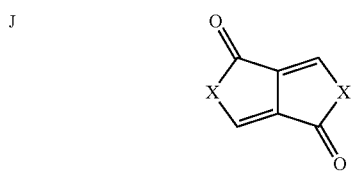
K 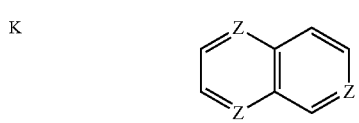
L 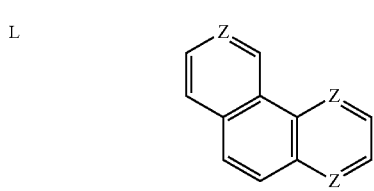
M 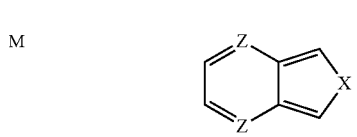
TABLE A MONOMERS
N 
O 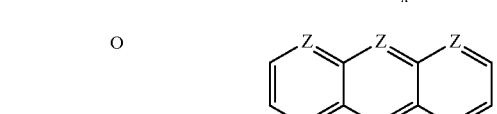
P 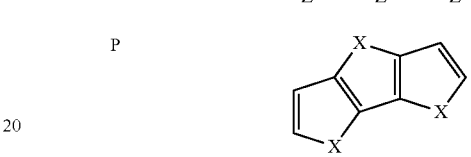
Q 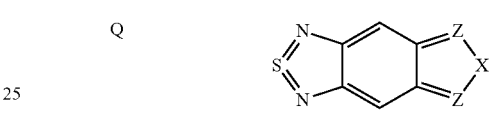
R 
S 
T 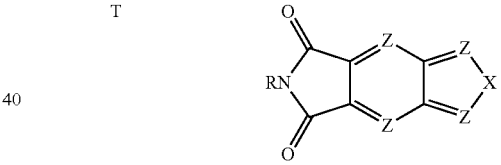
U 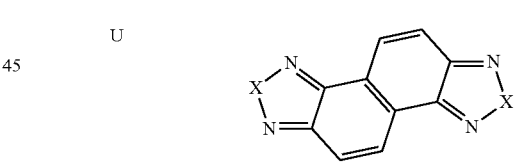
V 
W 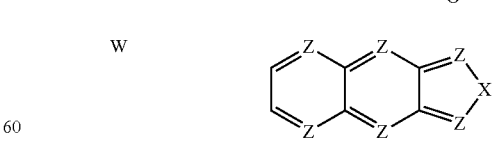
X 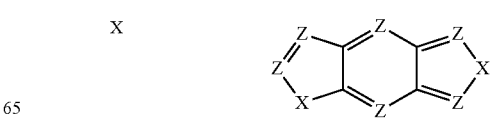

TABLE A MONOMERS

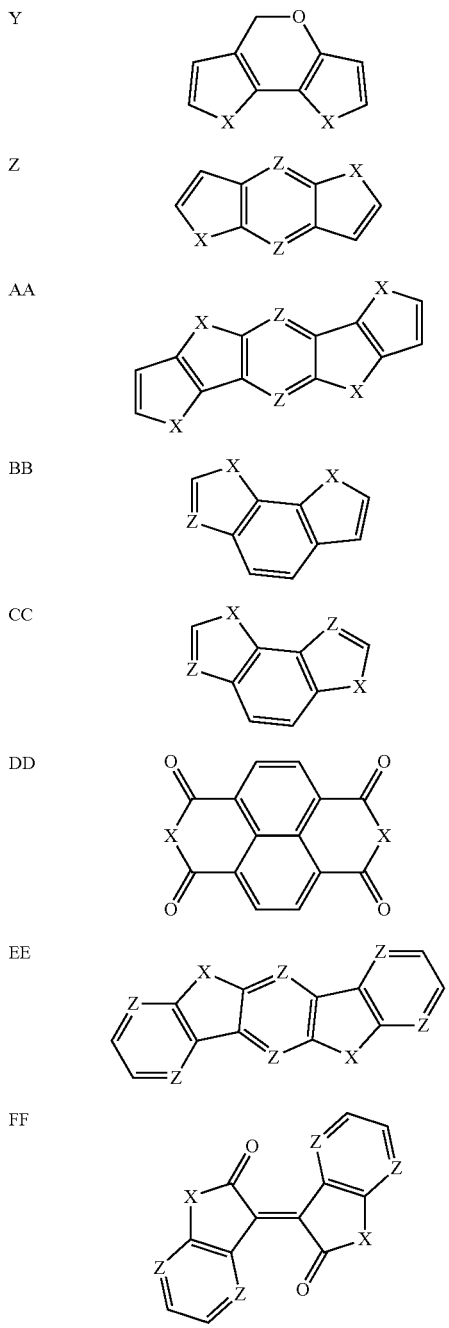

Wherein each X (X=C—R2, S, O=S=O, Se, Si—R2, Ge—R2, O, P—R, N—R) and Z (Z=C—R, S, Se, P, N) is independently selected in each instance and each instance of R is independently selected from H, alkyl, substituted alkyl, aryl, substituted aryl, non-aromatic carbocycles, non-aromatic heterocycles, heteroaryl, and substituted heteroaryl. Additionally these monomers may be substituted in a wide variety of ways to optimize electrical properties, synthesis, solubility, and other features. Specific, non-limiting examples include 1,3,4-thiadiazole, quinoxaline, benzo[c][1,2,5]thiadiazole, 2H-benzo[d]imidazole, benzo[c][1,2,5] thiadiazole, thieno[3,4-b]pyrazine, [1,2,5]thiadiazolo[3,4-g]quinoxaline, pyrazino[2,3-g]quinoxaline, 5H-indeno[5,6-c][1,2,5]thiadiazole-5,7(6H)-dione, naphtho[1,2-c:5,6-c']bis([1,2,5]thiadiazole), 4H-dithieno[3,2-b:2',3'-d]pyrrole, fluorene, carbazole, benzofuran, thieno[3,2-b]thiophene, thiazolo[5,4-d]thiazole, 4H-cyclopenta[2,1-b:3,4-b']dithiophene, benzo[1,2-d:3,4-d']bis(thiazole), benzo[1,2-d:4,3-d']bis(thiazole), benzo[1,2-d:5,4-d']bis(thiazole), benzo[1,2-d:4,5-d']bis(thiazole), as well as the selenium analogues to the sulfur compounds.

Heteroaryl monomers are ideal due to the electron delocalization of the aromatic system and the electron density provided by hetero atoms such as sulfur. However, the inclusion of non-aromatic heterocycles and aromatic carbo cycles, even at positions within the oligomer not optimal for electronic gradient, can be tolerated and in many cases provides advantages in synthesis.

Another feature in the composition of the oligomer according to aspects of the present disclosure is that monomers of differing electron affinity have a lower HOMO-LUMO bandgap. Therefore, the optimal monomers to be used in a specific oligomer are more electron-rich monomers that have a high HOMO value and more electron-poor monomers that have a relatively low LUMO value. It should be noted that terms like electron-rich and electron-poor are relative and what may be an electron-poor monomer in one oligomer may function as an electron-rich monomer in another, and vice-versa. The utilization of the electron affinity gradient and the low HOMO-LUMO band gap results in an oligomer with a high degree of polarizability, allowing for greater energy storage.

The electron-donor and electron-acceptor groups further enhance the polarizability of the oligomer, especially when they are positioned on opposite sides of the oligomer such that the electron-donor(s) are on the side with higher electron affinity and the electron-acceptors are on the side with the lower electron affinity. These oligomeric dielectric materials can be described by the following structural formula:

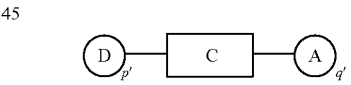

wherein C is a linear chain oligomeric polarizable core with a system of conjugated multiple and single bonds wherein the oligomer chain possesses an electron affinity gradient, there is at least one electron-donor group, D, attached to the polarizable core, there is at least one electron-acceptor group, A, attached to the polarizable core, p' and q' represent the number of electron-donor and electron-acceptor groups present, respectively, and are any integer greater than zero, and at least one resistive insulating group is covalently attached to the molecular structure at any location. The term conjugate multiple bond as used herein may refer to conjugated double, triple or quadruple bonds.

Placement of the electron-donor and electron-acceptor groups has some influence on their polarizability enhancement. Preferred embodiments place A and D on opposite, terminal monomers as described by the following structural formula:

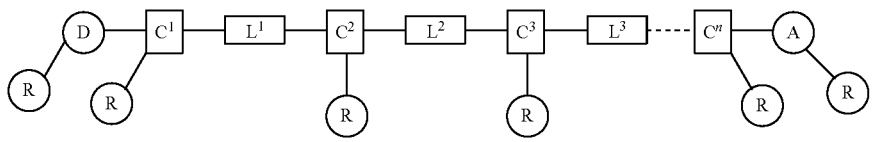

wherein the linear oligomeric polarizable core is comprised of a plurality of similar or different cyclic monomers $C^1$-$C^n$, that are connected to each other by $L^1$-$L^{n-1}$, each independently selected from possible linking groups that would retain a system of conjugated bonds throughout the oligomer, preferably single bonds, double bonds, —C≡C—, —C═N—, —N═N—, and acetylene, at least one electron-donor group, D, attached to a terminal cyclic monomer on the more electron dense end of the linear polarizable core, at least one electron-withdrawing group, A, attached to a terminal cyclic monomer on the less electron dense end of the linear polarizable core, R, are resistive insulating group locations and at least one resistive insulating group is bound to the material at one of the resistive insulating group locations.

To better demonstrate the concept of electron affinity gradient, the following depictions show how monomers of differing electron affinity can be incorporated into hexamers to result in oligomers with asymmetric electron affinity as shown in FIG. 1A. The general structural formula includes an electron donating group at one end and an electron accepting group at the other end and six units in between the two ends. The six units include some combination involving standard units with either electron rich units, electron poor units, or both electron rich units and electron poor units.

Figure 1B:
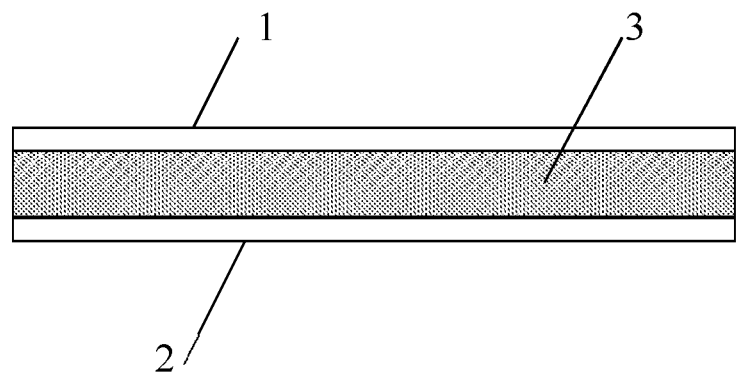
FIG. 1B shows a metacapacitor with two electrodes and a metadielectric according to aspects of the present disclosure.

In FIG. 1A, D is an electron donating group and A is an electron accepting group. While these particular depictions are hexamers, other oligomer lengths are possible. The 'standard unit' depicted is typically a heteroaryl or carbocycle of average electron density, preferred embodiments include benzene, thiophene, selenophene, phosphole, benzothiophene, benzoselenophene, phosphindole, isophosphindole, dibenzothiophene, dibenzoselenophene, benzophosphindole, phosphinine, phosphinoline, and acridophosphine. The 'electron rich unit' in FIG. 1A is a heteroaryl of low electron density such as pyrrole, indole, isoindole, carbazole, and dihydrothienodioxine. The 'electron poor unit' in FIG. 1B is a heteroaryl of high electron density such as benzothiodiazole, benzoselenadiazole, thienopyrazine, and selenophenopyrazine. However, electron rich and electron poor are relative terms. It is possible for a "standard unit", such as thiophene, for example, to function as the electron rich monomer when adjacent to sufficently electron poor monomers. From these depictions it can be seen that electron-rich and electron-poor monomers may, but need not be, adjacent. Furthermore, the term gradient is not meant to necessitate that each successive monomer be more electron-rich or electron poor than the preceeding monomer. As long as the inclusion of an electron-rich or electron-poor monomer is incorporated in a manner that results in asymmetry within the oligomer the gradient as defined herein is achieved.

In some implementations of the invention A may be selected from —$NO_2$, —CHO (aldehyde), —CRO (keto group), —$SO_3H$ (sulfonic acids), —$SO_3R$ (sulfonates), —$SO_2NH_2$, —SONRH, —$SONR_2$ (sulfonamides), —COOH (carboxylic acid), —COOR (esters, from carboxylic acid side), —$CONH_2$, —CONHR, —$CONR_2$ (amides, from carboxylic acid side), —$CF_3$, —$CCl_3$, and —CN, and D may be selected from —$NH_2$, —NHR, —$NR_2$, —OH, OR (ethers), —NHCOR (amides, from amine side), —OCOR (esters, from alcohol side), alkyls, and —$C_6H_5$, vinyls, wherein R and R' and R" are radicals selected from the list comprising hydrogen, alkyl (methyl, ethyl, isopropyl, tert-butyl, neopentyl, cyclohexyl etc.), allyl (—$CH_2$—CH═$CH_2$), benzyl (—$CH_2C_6H_5$) groups, phenyl (+substituted phenyl) and other aryl (aromatic) groups.

Preferred, but not limiting, embodiments of insulating resistive groups include hydrocarbon and halohydrocarbon chains, non-aromatic hydrocarbocycles, non-aromatic heterocycles, aryls, siloxanes, and/or polyethylene glycol linear or branched chains. In some embodiments, it may be preferable for the insulating resistive groups to be rigid. In such embodiments, rigid insulating resistive groups may be non-aromatic carbocycles, non-aromatic heterocycles, and aryl groups.

For demonstrative purposes, some narrow potential embodiments of the composite oligomer are shown below. In no way are these examples intended to be limiting.

TABLE 1

Examples of Composite Oligomeric Dielectric Organic Material Compounds

| Oligomer | No. |
|---|---|
| [structure image] | 1 |

TABLE 1-continued
Examples of Composite Oligomeric Dielectric Organic Material Compounds
| Oligomer | No. |
|---|---|
| 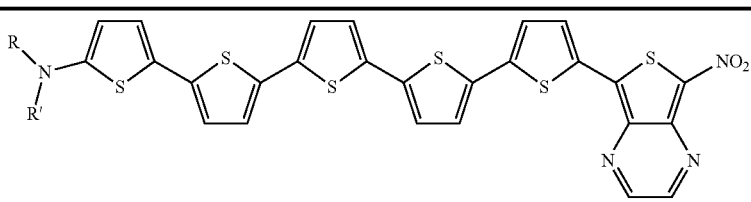 | 2 |
| 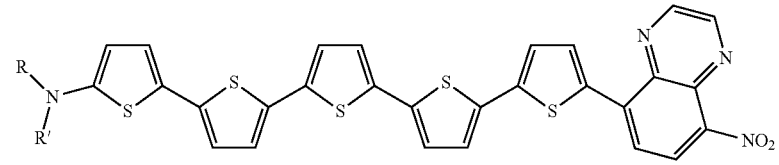 | 3 |
| 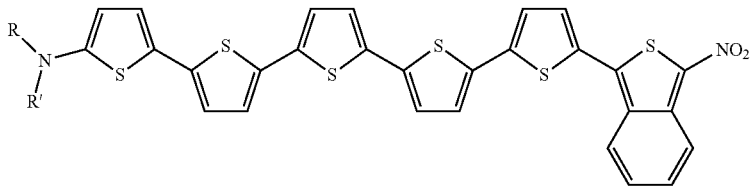 | 4 |
| 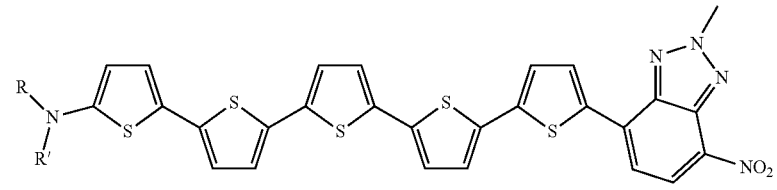 | 5 |
| 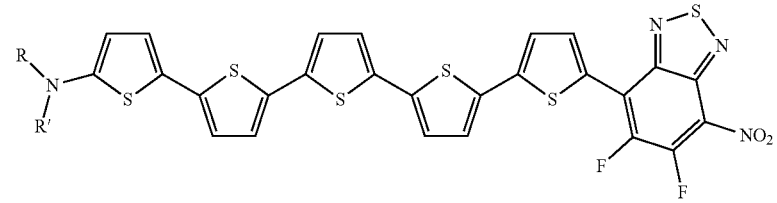 | 6 |
| 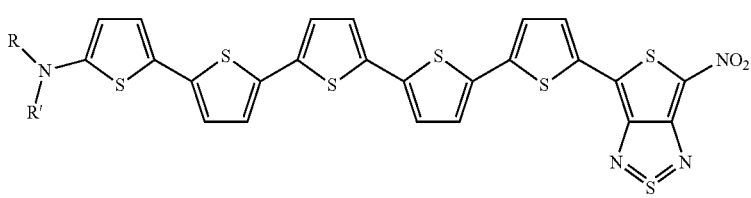 | 7 |
| 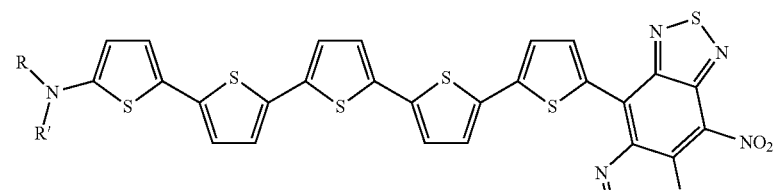 | 8 |
| 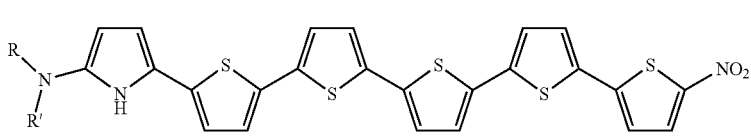 | 9 |

TABLE 1-continued

Examples of Composite Oligomeric Dielectric Organic Material Compounds

| Oligomer | No. |
|---|---|
| | 10 |
| | 11 |
| | 12 |
| | 13 |
| | 14 |
| | 15 |
| | 16 |

TABLE 1-continued

Examples of Composite Oligomeric Dielectric Organic Material Compounds

| Oligomer | No. |
|---|---|
| (structure) | 17 |
| (structure) | 18 |
| (structure) | 19 |
| (structure) | 20 |
| (structure) | 21 |

TABLE 1-continued

Examples of Composite Oligomeric Dielectric Organic Material Compounds

| Oligomer | No. |
|---|---|
| | 22 |
| | 23 |
| | 24 |
| | 25 |
| | 26 |
| | 27 |

TABLE 1-continued

Examples of Composite Oligomeric Dielectric Organic Material Compounds

| Oligomer | No. |
|---|---|
| | 28 |
| | 29 |
| | 30 |
| | 31 |
| | 32 |

TABLE 1-continued

Examples of Composite Oligomeric Dielectric Organic Material Compounds

| Oligomer | No. |
|---|---|
| | 33 |
| | 34 |
| | 35 |
| | 36 |

Where R and R' can independently at all instances be any insulating resistive group, preferably alkyl, cycloalkyl, or aryl groups.

In another embodiment, a composite oligomer may be attached to a polymer. This is termed a "side-chain polymer" system. This system has the advantages over guest-host systems because high composite oligomer concentrations are incorporated into the polymer with high order and regularity and without phase separation or concentration gradients. These systems are cross-linked or non-cross-linked. As a non-limiting example, a side-chain polymer may be comprised of a polymeric backbone and a polarizable side-chain, wherein the polarizable side-chain is selected from composite oligomeric organic compounds described by the structural formula;

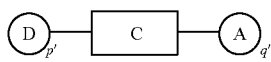

wherein C is a linear chain oligomeric polarizable core with a system of conjugated multiple and single bonds wherein one end of the oligomer has greater electron density than the other end and, there is at least one electron-donor group, D, attached to the polarizable core, there is at least one electron-acceptor group, A, attached to the polarizable core, and p' and q' represent the number of electron-donor and electron-acceptor groups present, respectively, and are any integer greater than zero. The polymer must possess resistive insulating groups. These resistive insulating groups may be within the backbone, may be used to connect the polarizable side-chain to the backbone, may be covalently attached to the polarizable side-chain, or may themselves be side-chains in a copolymer species.

Potential, nonlimiting, examples are shown below, the polymer may be a homopolymer or a copolymer, the insulating resistive groups may be attached to the metadielectric core or a separate sidechain.

TABLE 2

Exemplary Homo-polymer and Copolymers

| | 37 |
|---|---|

TABLE 2-continued
Exemplary Homo-polymer and Copolymers
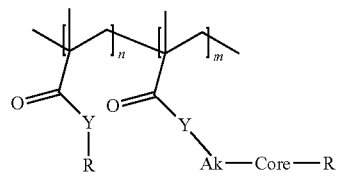
38
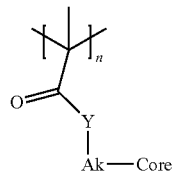
39
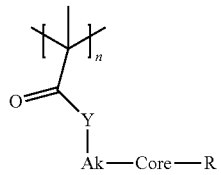
40
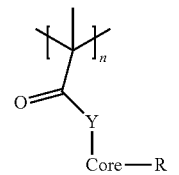
41
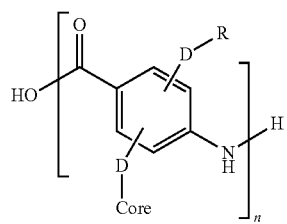
42
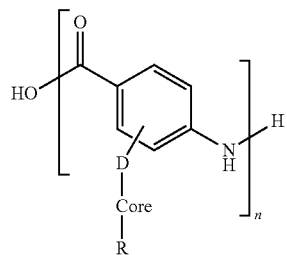
43
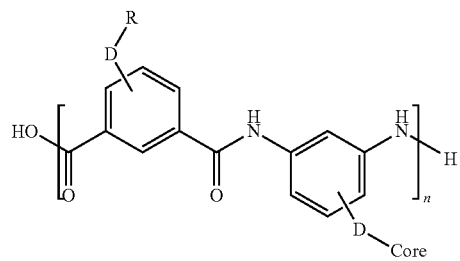
44
TABLE 2-continued
Exemplary Homo-polymer and Copolymers
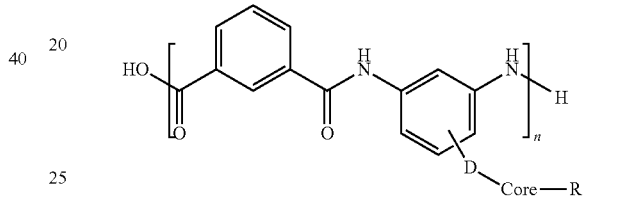
45
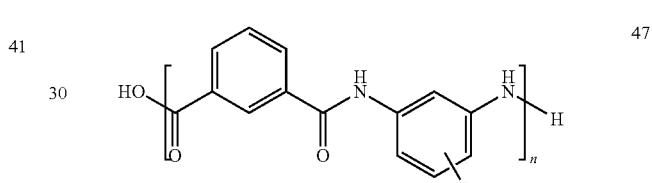
46
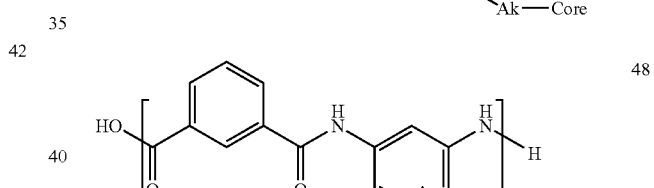
47
48
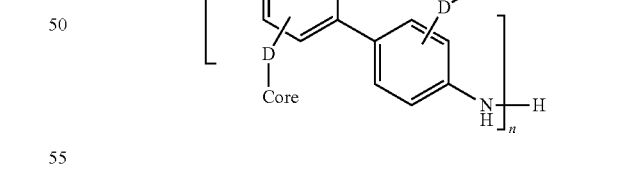
49
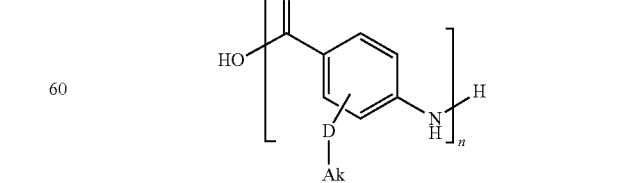
50

TABLE 2-continued

Exemplary Homo-polymer and Copolymers

51
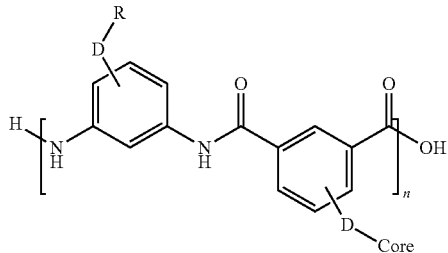

52
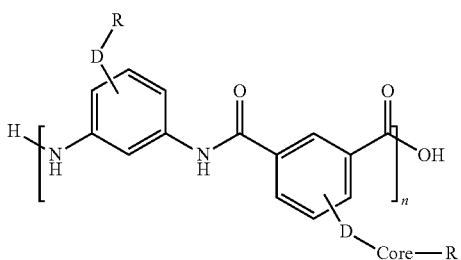

53
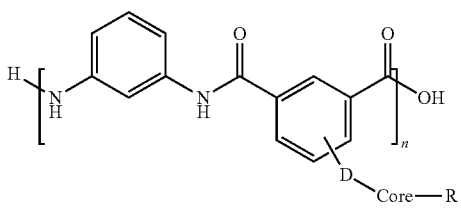

54
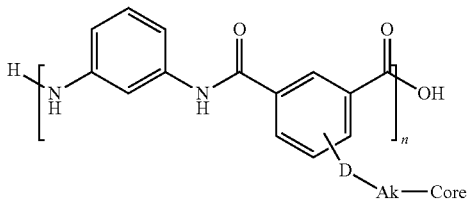

55
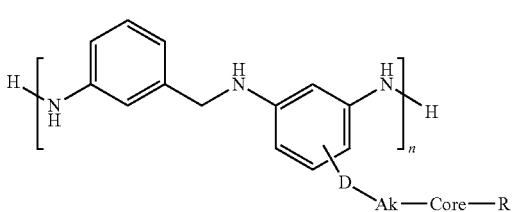

56
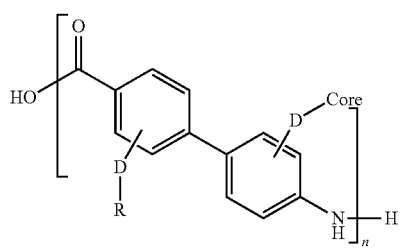

TABLE 2-continued

Exemplary Homo-polymer and Copolymers

57
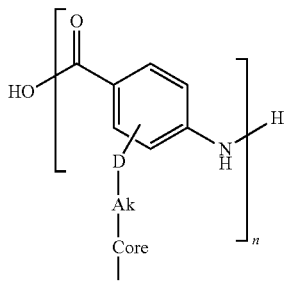

Wherein Core represents the conjugated oligomer with at least two different monomers to give an electronic gradient, and, when the Ak and R variables cannot satisfy the electron-acceptor requirement, Core includes the required electron-acceptor at any possible location, R is independently selected from hydrocarbon, halohydrocarbon, non-aromatic hydrocarbocycles, and non-aromatic heterocycles, which may be interrupted by hetero atoms, D is independently selected from —O—, —C(O)O—, -Ak-O— or —C(O)OAk-, —NR—, —NH—R, —C(O)NH—, —C(O)NR—, -Ak-NH—, Ak-NR—, Y is independently selected from O or NH or NAk, wherein Ak is any substituted or unsubstituted alkyl which may be interrupted by hetero atoms, n is 0-300, and m is 1-300.

In one implementation, the composite polymer may include more than one type of insulating resistive groups. In another embodiment, the composite polymer comprises more than one type of ordered insulating resistive groups. In yet another embodiment, the composite polymer comprises at least one insulating resistive group or at least one type of ordered insulating resistive groups.

By way of example, and not by way of limitation, according to aspects of the present disclosure, a metadielectric film may include a polymer matrix and at least one oligomeric dielectric material. In some embodiments, the metadielectric layer may be comprised of a mixture of oligomeric dielectric materials.

Alternatively, the metadielectric layer may be comprised of any organic composite oligomers, compounds, or polymers as disclosed in U.S. patent application Ser. No. 14/710,491 filed May 12, 2015, Ser. No. 15/043,186 filed Feb. 12, 2016, Ser. No. 15/043,209 filed Feb. 12, 2016, Ser. No. 15/194,224 filed Jun. 27, 2016, Ser. No. 15/043,247 filed Feb. 12, 2016, Ser. No. 15/090,509 filed Apr. 4, 2016, and Ser. No. 15/163,595 filed May 24, 2016 all of which are entirely incorporated herein.

In some implementations of the above metadielectric film, the polymer matrix may additionally include at least one monomer selected from acrylate, ester, and aramid. In some implementations of the above metadielectric film, the film may include a plasticizer. Use of non-ionic plasticizers can improve the metadielectric layer's resistivity through smoothing out electric field lines. This phenomenon occurs when the plasticizers fill voids and/or assists in supramolecular alignment. Additionally, plasticizers can improve the material's mechanical properties by reducing brittleness of the material during and post processing.

In some implementations of the above metadielectric film, the film may include a mixture of polyacrylate and polyamide materials. In some implementations of the above metadielectric film, the film may have a relative permittivity greater than or equal to 1000, a resistivity greater than or equal to $10^{16}$ Ohm cm. According to aspects of the present disclosure, metadielectric films of the type described herein may be used in metacapacitors. By way of example, and not by way of limitation, a metacapacitor according to certain aspects of the present disclosure may include a first electrode, a second electrode, and a metadielectric film, e.g., as described generally above or in further detail below, sandwiched between said first and second electrodes.

In some implementations, such a metacapacitor may be characterized by a capacitance that varies non-linearly with voltage.

In some implementations, one or more of the electrodes may be formed on a substrate of flexible tape, wherein the substrate, first and second electrodes, and the metadielectric film are coiled such that the substrate forms an isolation layer between the first and second electrodes, and wherein the substrate is selected metallic and plastic films.

FIG. 1B illustrates an example of a metacapacitor comprising a first electrode 1, a second electrode 2, and a metadielectric layer 3 disposed between said first and second electrodes as shown in FIG. 1B. The electrodes 1 and 2 may be made of a metal, such as copper, zinc, or aluminum or other conductive material such as graphite or carbon nanomaterials and are generally planar in shape.

The electrodes 1, 2 may be flat and planar and positioned parallel to each other. Alternatively, the electrodes may be planar and parallel, but not necessarily flat, they may be coiled, rolled, bent, folded, or otherwise shaped to form the capacitor. It is also possible for the electrodes to be non-flat, non-planar, or non-parallel or some combination of two or more of these. By way of example and not by way of limitation, a spacing d between the electrodes 1and 2 may range from about 3 nm to about 100 µm. The maximum voltage $V_{bd}$ between the electrodes 1and 2 is approximately the product of the breakdown field $E_{bd}$ and the electrode spacing d. If $E_{bd}$=0.1 V/nm and the spacing d between the electrodes 1 and 2 is 100 microns (100,000 nm), the maximum voltage $V_{bd}$ would be 10,000 volts.

Additionally, the metacapacitor may have an insulation layer to insulate electrodes 1 and 2 from making ohmic contact with each other in coiled, rolled, bent, and folded embodiments. Non-limiting examples of the insulation layer include metadielectric material, polypropylene (PP), polyethylene terephthalate polyester (PET), polyphenylene sulfide (PPS), polyethylene naphthalate (PEN), polycarbonate (PP), polystyrene (PS), and polytetrafluoroethylene (PTFE).

The electrodes 1 and 2 may have the same shape as each other, the same dimensions, and the same area A. By way of example, and not by way of limitation, the area A of each electrode 1 and 2 may range from about 0.01 m$^2$ to about 1000 m$^2$. By way of example and not by way of limitation for rolled capacitors, electrodes up to, e.g., 1000 m long and 1 m wide.

These ranges are non-limiting. Other ranges of the electrode spacing d and area A are within the scope of the aspects of the present disclosure.

If the spacing d is small compared to the characteristic linear dimensions of electrodes (e.g., length and/or width), the capacitance C of the capacitor may be approximated by the formula:

$$C=\varepsilon\varepsilon_o A/d, \quad (I)$$

where $\varepsilon_o$ is the permittivity of free space (8.85×10$^{-12}$ Coulombs$^2$/(Newton·meter$^2$)) and $\varepsilon$ is the dielectric constant of the dielectric layer. The energy storage capacity U of the capacitor may be approximated as:

$$U=\tfrac{1}{2}\varepsilon\varepsilon_o AE_{bd}^2 d \quad (II)$$

The energy storage capacity U is determined by the dielectric constant $\varepsilon$, the area A, the electrode spacing d, and the breakdown field $E_{bd}$. By appropriate engineering, a capacitor or capacitor bank may be designed to have any desired energy storage capacity U. By way of example, and not by way of limitation, given the above ranges for the dielectric constant $\varepsilon$, electrode area A, and breakdown field $E_{bd}$ a capacitor in accordance with aspects of the present disclosure may have an energy storage capacity U ranging from about 500 Joules to about 2·10$^{16}$ Joules.

For a dielectric constant $\varepsilon$ ranging, e.g., from about 100 to about 1,000,000 and constant breakdown field $E_{bd}$ between, e.g., about 0.1 and 0.5 V/nm, a capacitor of the type described herein may have a specific energy capacity per unit mass ranging from about 10 W·h/kg up to about 100,000 W·h/kg, though implementations are not so limited.

Alternatively, in some embodiments, electrodes 1 and 2 may have different shapes from each other with the same or different dimensions, and the same or different areas.

Figure 2A:
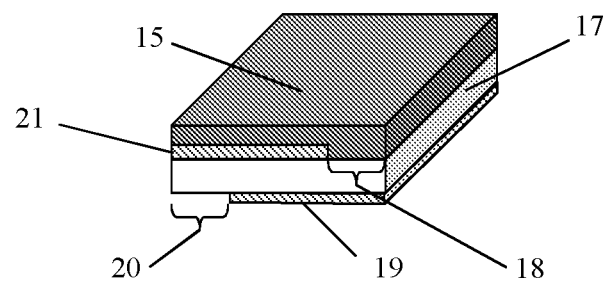
FIG. 2A shows a formation of two metal strips on top and bottom surfaces of the plastic layer for a coiled metacapacitor according to an aspect of the present disclosure.
Figure 2B:
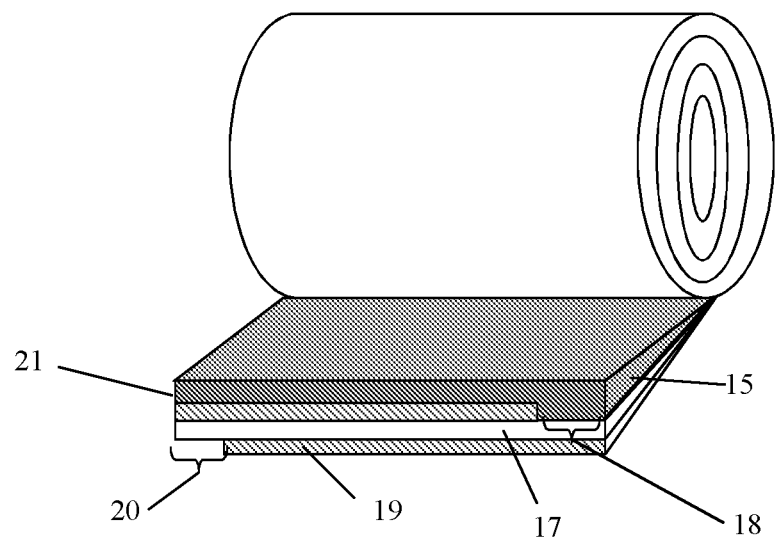
FIG. 2B shows a winding of the multilayered tape for a coiled metacapacitor according to an aspect of the present disclosure.
Figure 3:
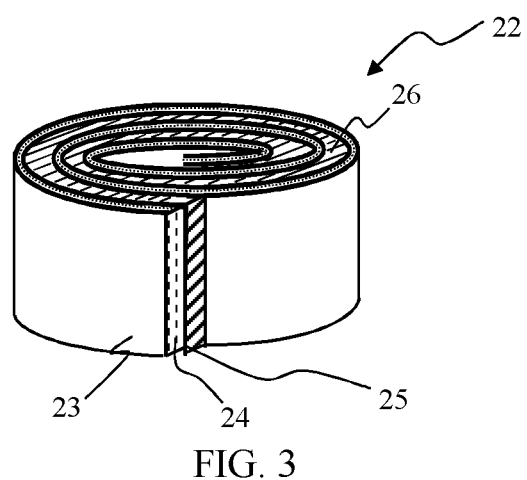
FIG. 3 shows a coiled film metacapacitor according to an aspect of the present disclosure.

The present disclosure includes metacapacitors that are coiled, e.g., as depicted in FIGS. 2A, 2B and 3. As shown in FIG. 2A, electrodes 19, 21, e.g., metal electrodes, are formed onto opposite surfaces of a metadielectric layer 17 with margin portions 18, 20 that are free of metal located on opposite edges of the metadielectric layer 17. In some embodiments, such a configuration of electrodes 19, 21 and metadielectric layer 17 form a tape or a multilayered tape. An electrically insulating layer 15, e.g., a plastic material is formed over one of the electrodes 21 or a plastic film is overlaid on one of the electrodes 21. The electrically insulating layer 15 may include metadielectric materials or common capacitor insulating materials such as PET. The metadielectric lay 17 may be formed, e.g., by applying a solution containing oligomeric dielectric material to the electrode 19 and then drying the applied solution to form a solid layer of the oligomeric dielectric material.

Alternatively, electrodes 19 and 21 may be formed onto opposite surfaces of an insulating layer 15 with margin portions 18, 20 that are free of electrode material located on opposite edges of the insulating layer 15. In some embodiments, such a configuration of electrodes 19, 21 and insulating layer 15 form a tape or a multilayered tape. The electrically insulating layer 15 may include metadielectric materials or common capacitor insulating materials such as PET. The metadielectric lay 17 may be formed, e.g., by applying a solution containing oligomeric dielectric material to the electrode 19 and then drying the applied solution to form a solid layer of the oligomeric dielectric material.

The thickness of the metadielectric layer may be a relatively uniformly thick layer. The metadielectric layer thickness may range from 0.01 µm to 50 µm depending on the desired maximum capacitor voltage. In general, thicker metadielectric layers are used for higher maximum capacitor voltages. Furthermore, with a given metacapcitor the metadielectric layer thickness may vary due to normal manufacturing process variations, e.g., by about 1% to 10% of a nominal thickness value. In this example shown in FIG. 2A the first metal electrode 19 is formed on a portion of a first surface of the metadielectric layer 17 with a first margin portion 18 that is free of metal. The second electrode 21 is formed on a portion of a second surface of the plastic layer with a second margin portion 20 located on an opposite edge of the metadielectric layer 17 being free of metal. The multilayered structure depicted in FIG. 2A may be wound into a coil as shown in FIG. 2B. The insulating layer 15 prevents undesired electrical shorts between the first and second electrodes after being wound into the coil. By way of example and not by way of limitation, the insulating layer 15 may include a metadielectric material, polypropylene (PP), polyethylene terephthalate polyester (PET), polyphenylene sulfide (PPS), polyethylene naphthalate (PEN), polycarbonate (PP), polystyrene (PS), or polytetrafluoroethylene (PTFE).

In the example depicted in FIG. 4, a metacapacitor 22 comprises a first electrode 23, a second electrode 25, and a metadielectric material layer 24 of the type described herein disposed between said first and second electrodes. The electrodes 23 and 25 may be made of a metal, such as copper, zinc, or aluminum or other conductive material such as graphite or carbon nanomaterials and are generally planar in shape. In one implementation, the electrodes and metadielectric material layer 24 are in the form of long strips of material that are sandwiched together and wound into a coil along with an insulating material 26, e.g., a plastic film such as polypropylene or polyester to prevent electrical shorting between the electrodes 23 and 25. Alternatively, the insulating material may include a metadielectric layer comprised of any composite oligomer or polymer formed therefrom or mixture thereof, as described herein below. In some embodiments, the electrodes may be multilayered structures consisting of a conductive layer and any combination of one or more of layers selected from the list of field planarization layer, surface planarization layer, electron blocking layer, and hole blocking layer. For examples, a metacapacitor may have a sequence (E-B1-D2-B2-E-B1-D2)$_m$ wherein E are electrodes, B1 and B2 are respectively a hole blocking layer and electron blocking layer (or vice versa), D1 is a metadielectric layer, D2 is selected from a metadielectric layer or a plastic isolation layer (i.e. polypropylene), and m is an integer greater than or equal to 1. Non-limiting examples of capacitors and electrodes comprised of field planarization and surface planarization layers are described in U.S. patent application Ser. No. 15/368,171 which is herein incorporated by reference in its entirety.

Non-limiting examples of suitable coiled capacitors are described in U.S. patent application Ser. No. 14/752,600 which is herein incorporated by reference in their entirety. In this aspect, the present invention provides a coiled capacitor comprising a coil formed by a flexible multilayered tape, and a first terminating electrode (a first contact layer) and a second terminating electrode (a second contact layer) which are located on butts of the coil. The flexible multilayered tape contains the following sequence of layers: first metal layer, a layer of a plastic, second metal layer, a layer of energy storage material. The first metal layer forms an ohmic contact with the first terminating electrode (the first contact layer) and the second metal layer (the second contact layer) forms an ohmic contact with the second terminating electrode. The layer of energy storage material may be any oligomer or polymer described herein.

In order that the disclosure may be more readily understood, reference is made to the following examples, which are intended to be illustrative of the invention, but are not intended to limit the scope.

In one embodiment, a liquid or solid composite oligomer is placed between the first and second electrodes. A solid is, for example, pressed into a pellet and placed between the first electrode and the second electrode. The solid can be ground into a powder before pressing.

In another embodiment, at least one type of oligomeric dielectric material may be dissolved or suspended in a solvent. The resultant material can be spin coated, extruded via slot die, roll-to-roll coated, or pulled and dried to form a dielectric film.

In another embodiment, a composite oligomer may be dissolved or suspended in a polymer. This is termed a "guest-host" system where the oligomer is the guest and the polymer is the host. Polymer hosts include, but are not limited to, poly(methyl methacrylate), polyimides, polycarbonates and poly(ε-caprolactone). These systems are cross-linked or non-cross-linked.

The insulating resistive groups, ordered or disorder, may also crosslink to further enhance the structure of the dielectric film which can reduce localized film defects and enhance the film's breakdown voltage or breakdown field. Further, a polymer of a composite non-linear polarizable compound and electrically resistive chain may crosslink inter- and/or intra polymer backbones to enhance the dielectric film structure, which can reduce localized film defects and enhance the film's breakdown voltage or breakdown field. Further, ordered insulating resistive groups can improve solubility of the composite compound in organic solvents. Still further, the insulating resistive groups can act to hinder electro-polar interactions between supramolecular structures formed from pi-pi stacking of the optionally attached polycyclic conjugated molecule. Even further, the insulating resistive groups can act to hinder electro-polar interaction between repeat units of a polymer consisting of non-linear polarizable compounds.

An oligomer consisting of a monomer with a non-linear polarizable compound and an insulating resistive group substituent can be used to introduce some order to dielectric films consisting of said oligomer due to the insulating resistive group and non-linear polarizable compounds forming polar, pi-pi, van der Waals interaction, or any combination thereof.

In another embodiment, composite oligomers may be embedded in matrices such as oxides, halides, salts and organic glasses. An example of a matrix is inorganic glasses comprising the oxides of aluminum, boron, silicon, titanium, vanadium and zirconium.

According to aspects of the present disclosure, the composite oligomers that make up a dielectric oligomeric dielectric material may be aligned, partially aligned or unaligned. The composite oligomer is preferably aligned for optimal geometric configuration of polarizing units as this results in higher capacitance values in the capacitor. One method of alignment is to apply a DC electric field to the composite oligomer at a temperature at which the polarizable units can be oriented. This method is termed "poling." Poling is generally performed near the glass transition temperature of polymeric and glassy systems. One possible method of poling is corona poling. Other methods of alignment could be roll-to-roll, Meyer bar, dip, slot die, and air knife coating of solutions and liquid crystal solutions of said side-chain polymers or composite oligomers.

In some instances, the side-chain polymer or composite oligomers may form liquid crystals in solution or solvent and with or without external influence. Non-limiting examples of liquid crystals include lyotropic and thermotropic liquid crystals. Non-limiting examples of external influences include heat, electric field, mechanical disturbances (e.g. vibration or sonication), and electromagnetic radiation. Said liquid crystals are supramolecular structures comprised of said side-chain polymers or composite oligomer in solution or solvent and are ordered and aligned or partially ordered or partially aligned. Such liquid crystal materials may be coated onto a substrate, e.g., by roll-to-roll, Meyer bar, dip, slot die, or air knife coating in a process that includes mechanical ordering of the liquid crystals, and drying of the liquid crystal solution or evaporation of the solvent such that the liquid crystals form a crystalline or semi-crystalline layer or film of metadielectric material. Alternatively, such liquid crystal materials may be extruded as a film such that the liquid crystals form a crystalline or semi-crystalline film of metadielectric material. In some instances, extrusion of such liquid crystal materials may be coextruded as a multilayer film. Such multilayer films may include alternating layers of conducting layers and insulating layers, wherein the insulating layers may be the aforementioned crystalline or semi-crystalline layer of metadielectric material.

Preferred polymer embodiments are polyester, polyalkylacrylate (preferably methacrylic and acrylic), polyamide, and polyaramid. This insulating resistive group may be attached to the polarizable side chain or may be its own independent side chain interspersed in any pattern or random assortment with the polarizable side chains or a mixture thereof. These species can be represented by one of the following formula.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. A metadielectric composite oligomeric organic material having a formula selected from formulae 37-57:

37
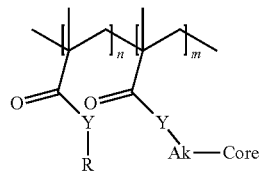

38
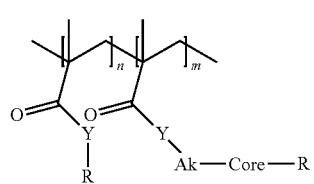

39
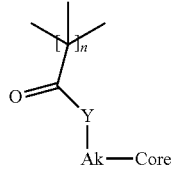

40
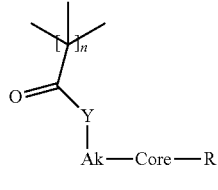

41
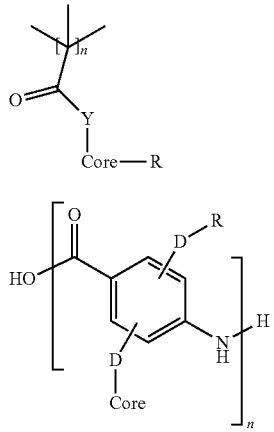

42

43
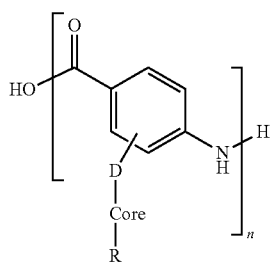

44
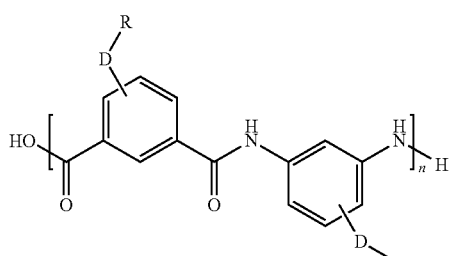

45
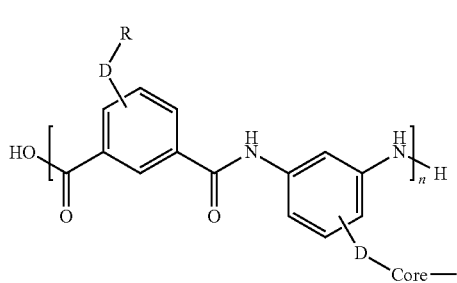

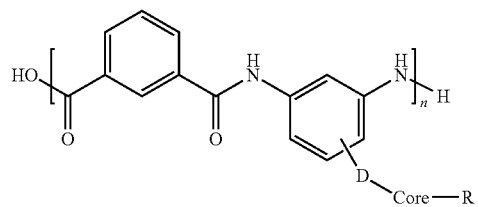
46
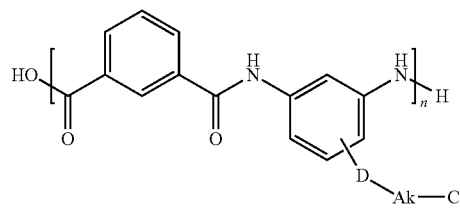
47
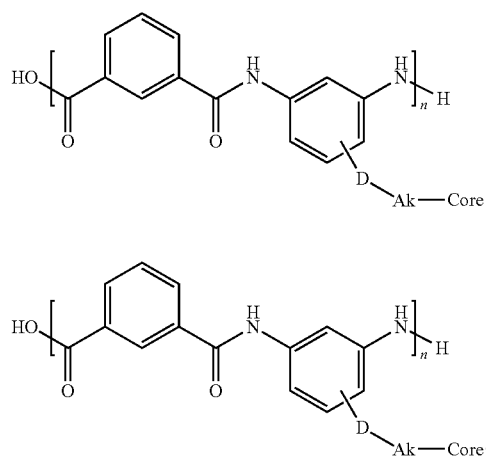
48
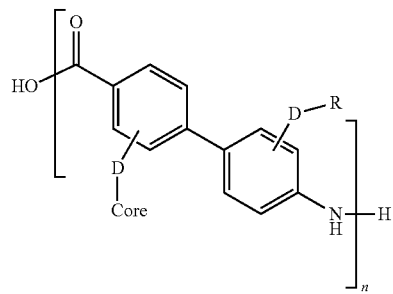
49
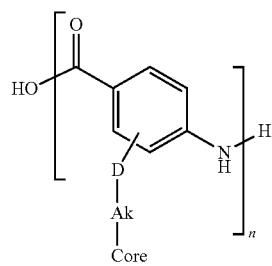
50
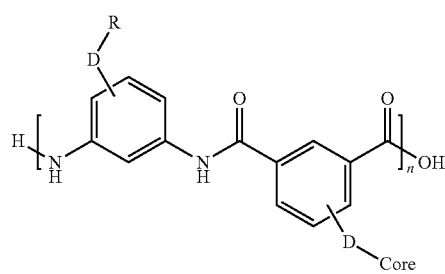
51
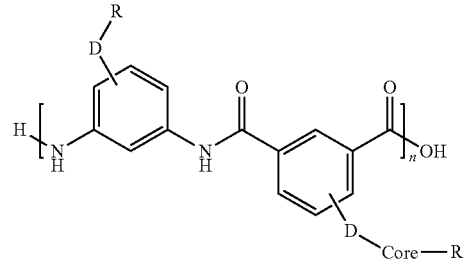
52
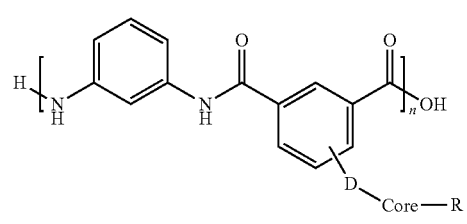
53
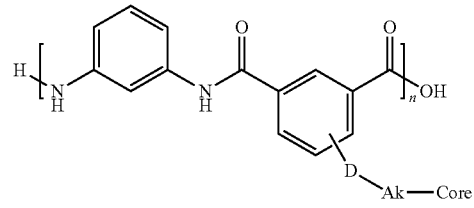
54
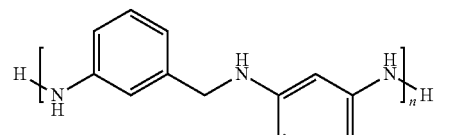
55
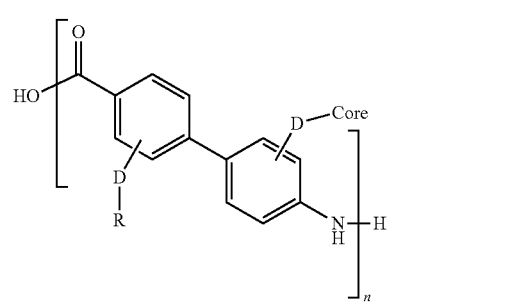
56
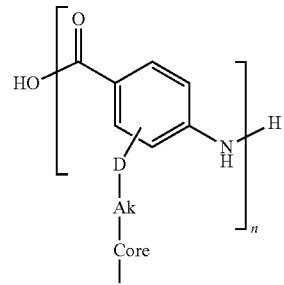
57 wherein:
Core is a conjugated oligomer comprising a metadielectric structure selected from structures 1 to 35:
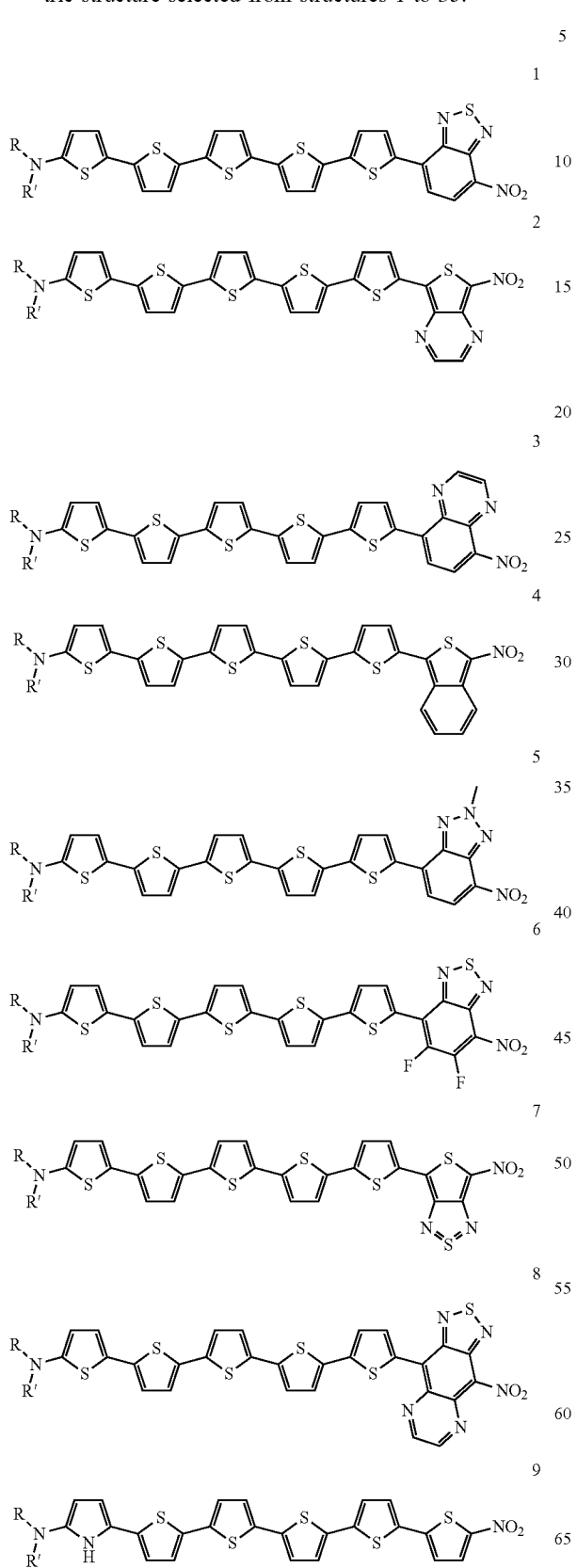
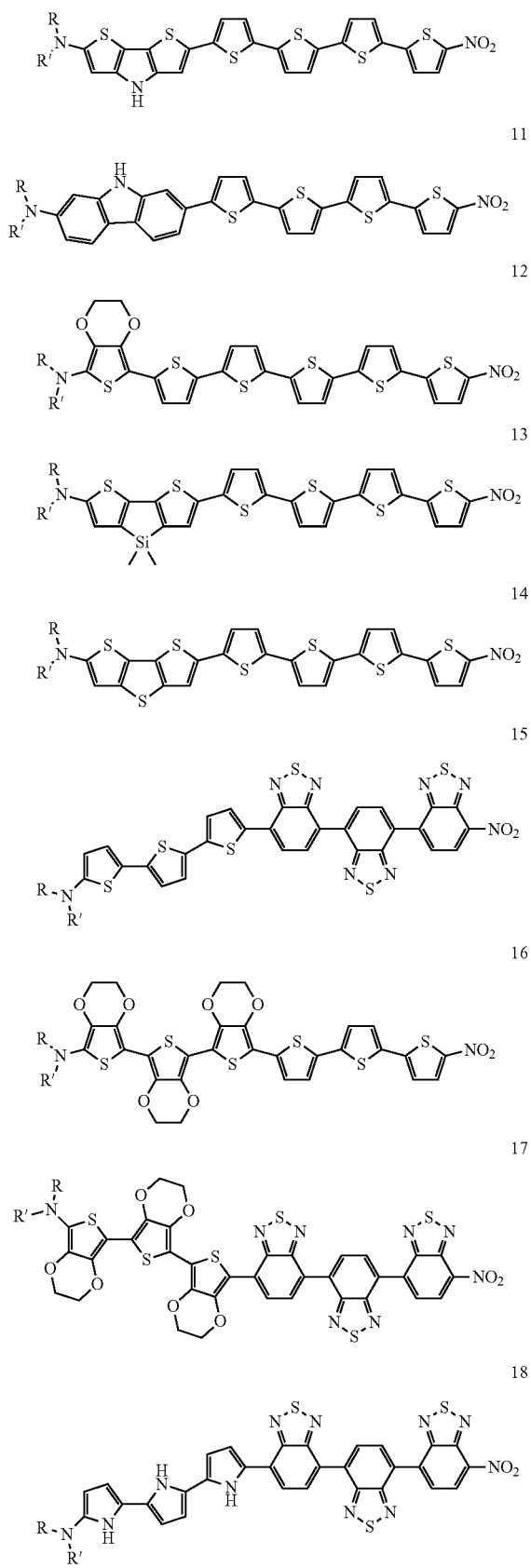

-continued
19
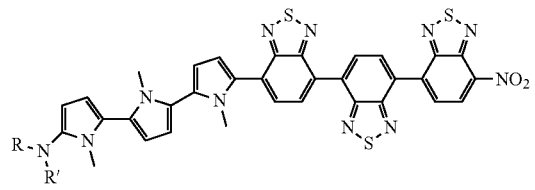
20
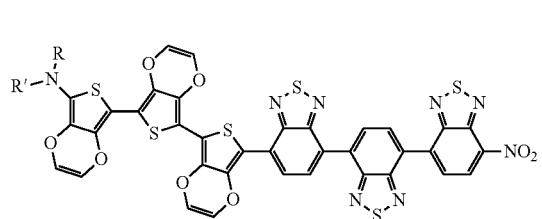
21
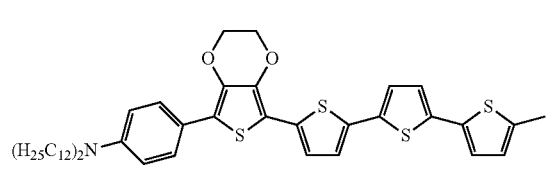
22
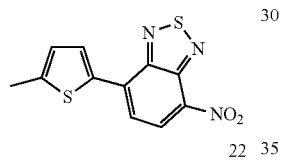
23
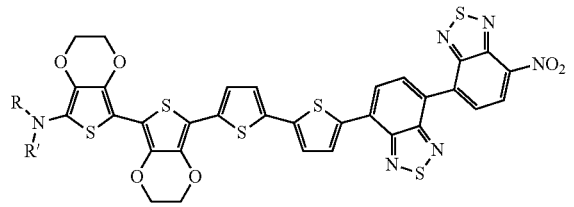
24
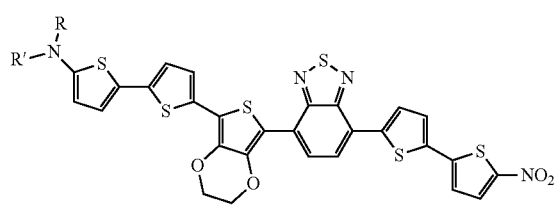
25
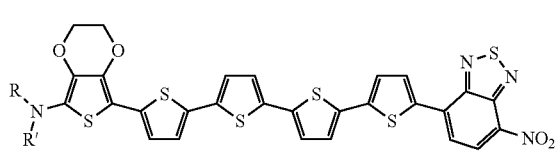
-continued
26
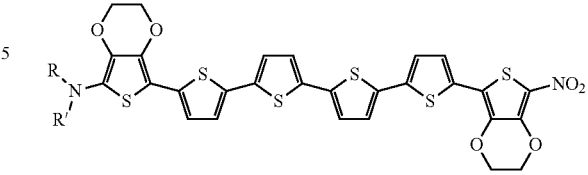
27
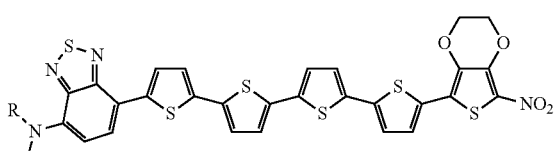
28
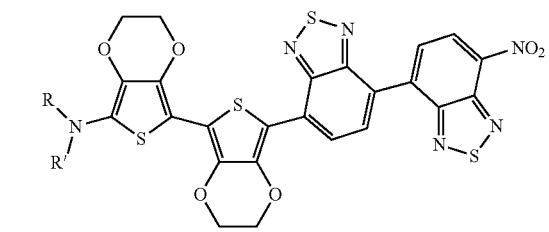
29
30
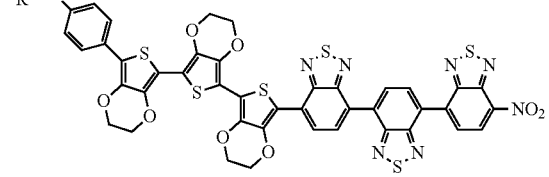
31
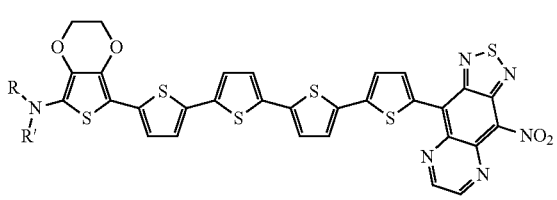
32
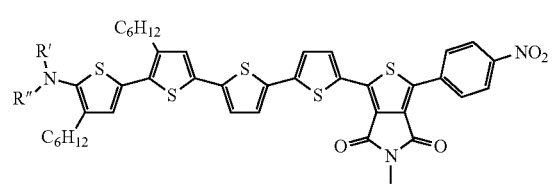

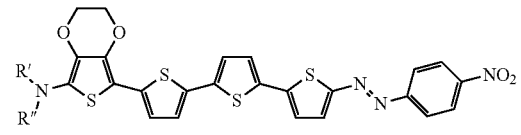

33

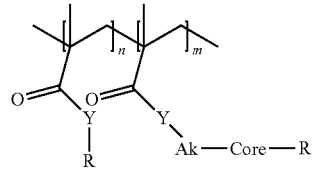

34

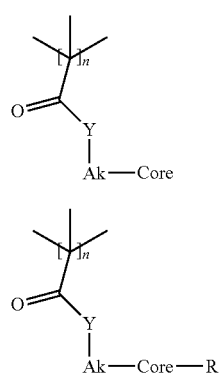

35 wherein R and R' present in the structures 1 to 35 can independently at all instances be any insulating resistive group;

D is independently selected from —O—, —C(O)O—, -Ak-O— or —C(O)OAk-, —NR—, —NH—R, —C(O)NH—, —C(O)NR, -Ak-NH—, Ak-NR—; wherein R is independently selected from hydrocarbon chains, halohydrocarbon chains, non-aromatic hydrocarbocycles, and non-aromatic heterocycles, which may be interrupted by hetero atoms; and wherein Ak is any substituted or unsubstituted alkyl which may be interrupted by hetero atoms;

Y is independently selected from O or NH or NAk, wherein Ak is any substituted or unsubstituted alkyl which may be interrupted by hetero atoms;

n is 0-300, and m is 1-300; and wherein at least one of Ak, R and Core includes an electron acceptor group selected from —NO$_2$, —CHO, —CR'O, —SO$_3$H, —SO$_3$R', SO$_2$NH$_2$, —SO$_2$NHR', —SO$_2$NR"R''', —COOH, —COOR', —CONH$_2$, —CONHR', —CONR"R''', —CF$_3$, —CCl$_3$, —CN, wherein R' and R" and R''' are radicals independently selected from hydrogen, alkyl, allyl, benzyl groups, optionally substituted phenyl and aryl groups.

2. A metadielectric film material comprising at least the material of claim 1 in the form of a film.

3. A metacapacitor comprising:
a first electrode,
a second electrode,
and a metadielectric film of the type set forth in claim 2 sandwiched between said first and second electrodes.

4. A polymeric compound having a formula selected from formulae 37-57:

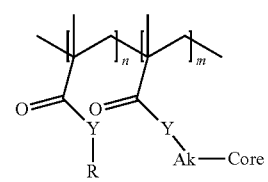

37

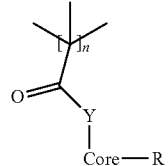

38

39

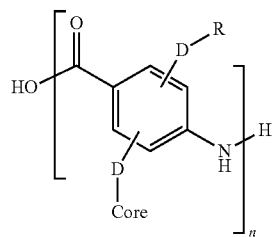

40

41

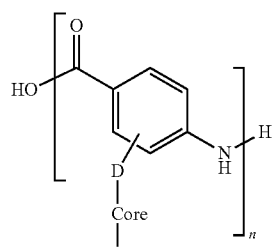

42

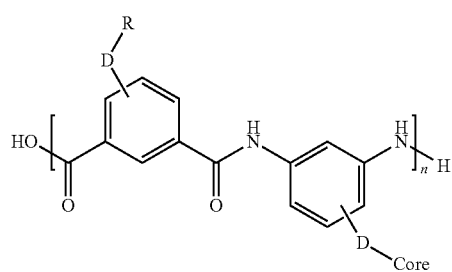

43

44

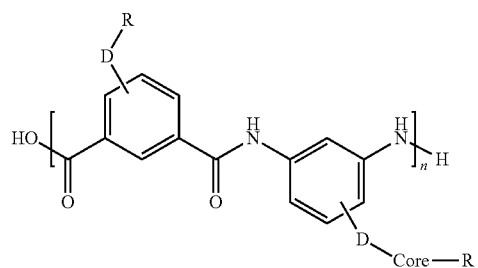
45
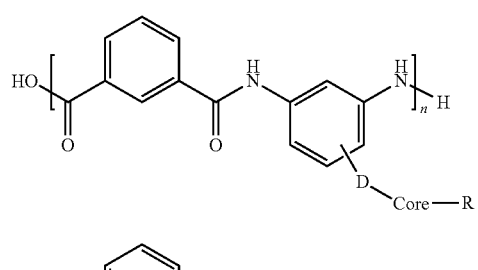
46
47
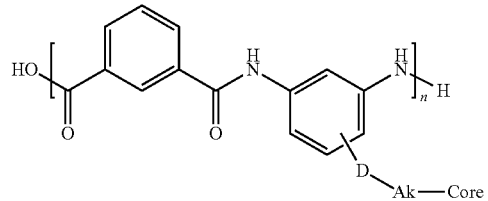
48
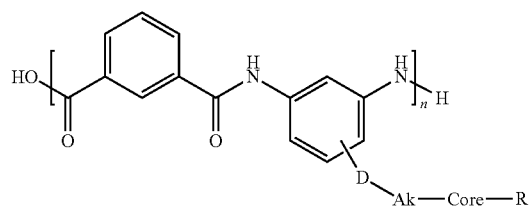
49
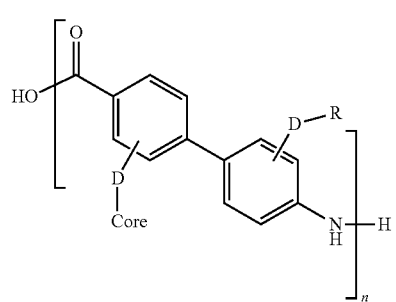
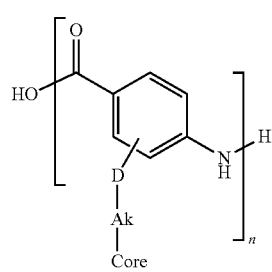
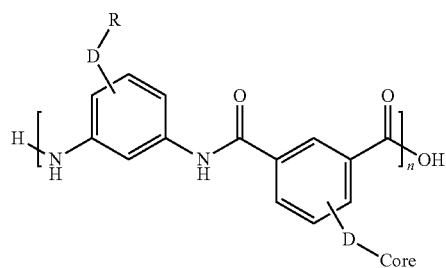
51
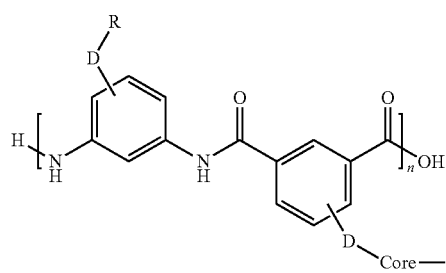
52
53
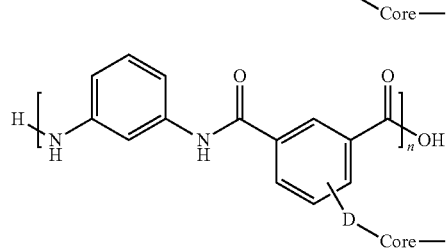
54
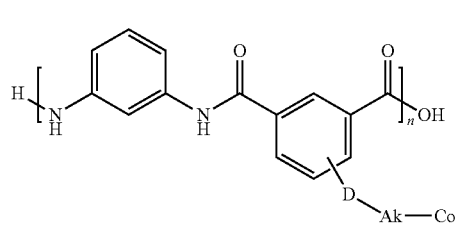
55
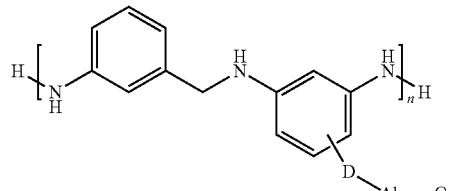
56
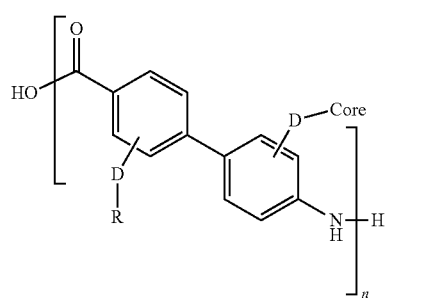

57
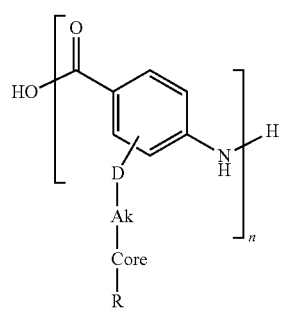
wherein:
Core is a conjugated oligomer comprising a metadielectric structure selected from structures 1 to 35:
1
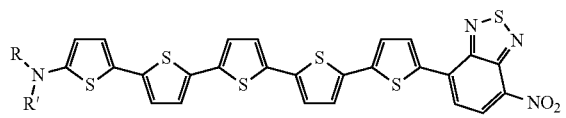
2
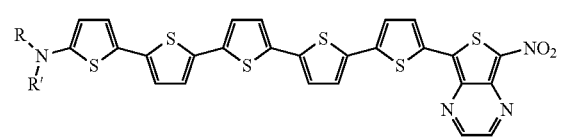
3
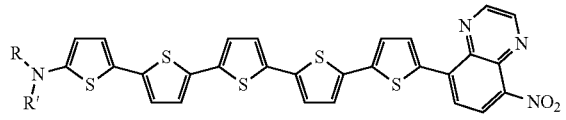
4
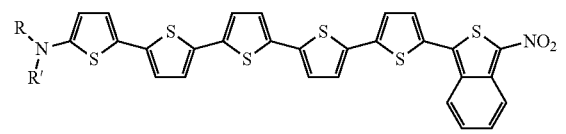
5
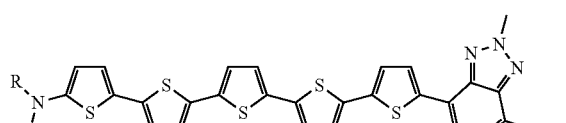
6
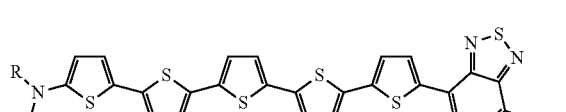
7
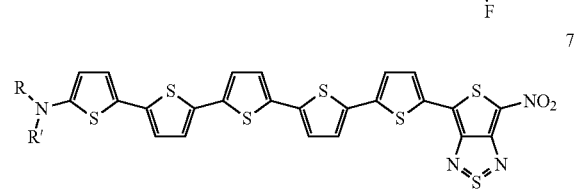
8
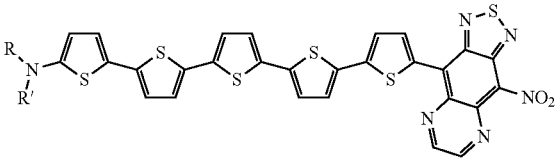
9
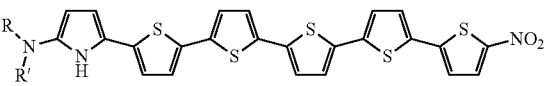
10
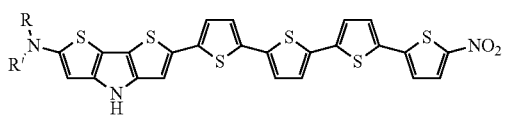
11
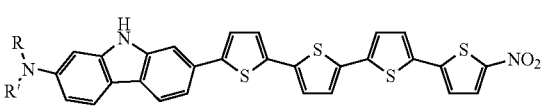
12
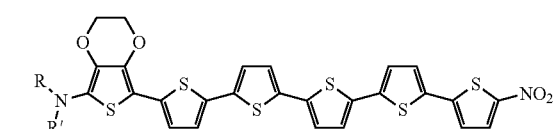
13
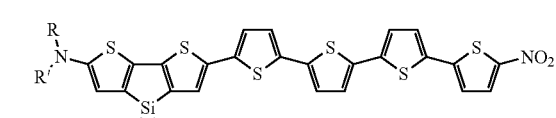
14
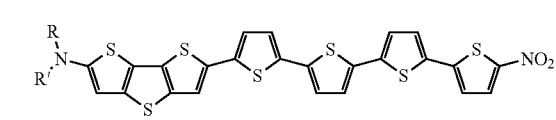
15
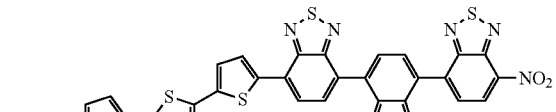
16
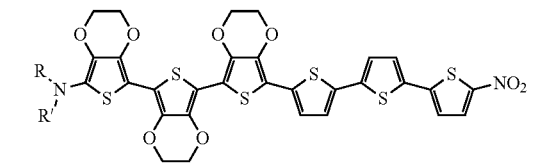

17
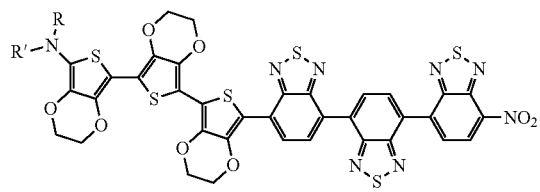
18
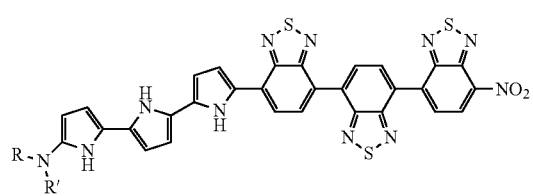
19
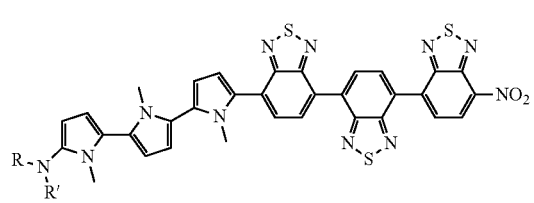
20
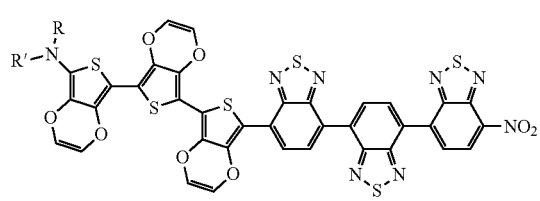
21
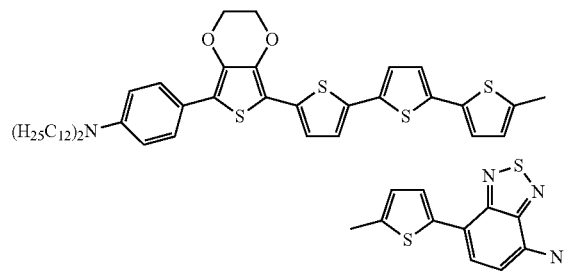
22
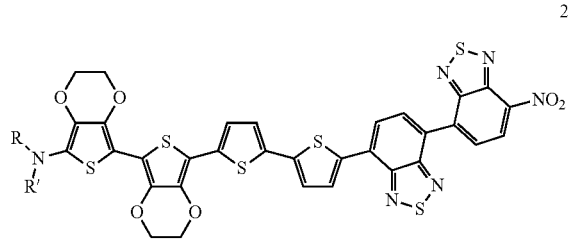
23
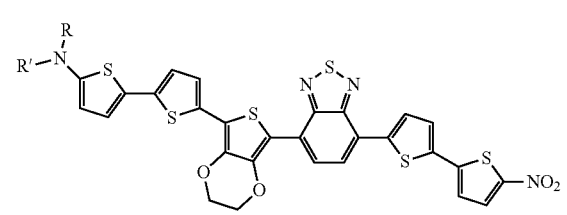
24
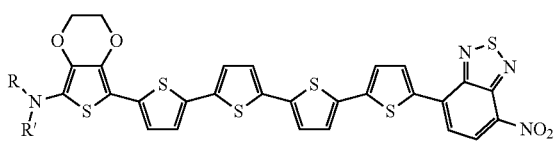
25
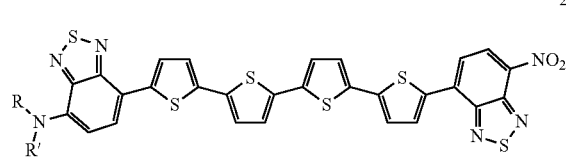
26
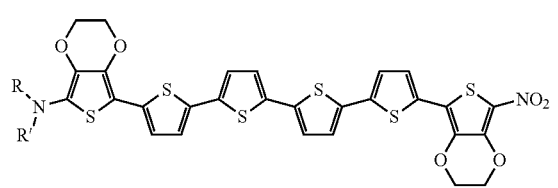
27
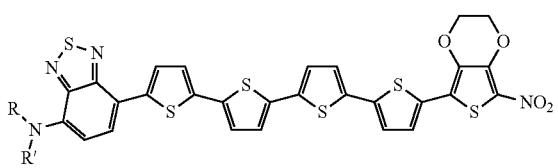
28
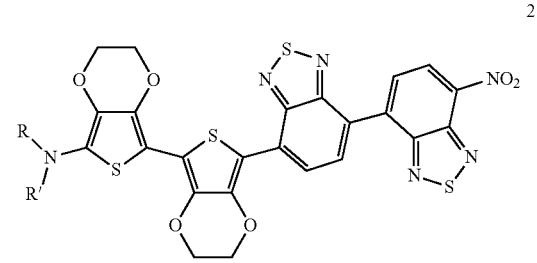
29
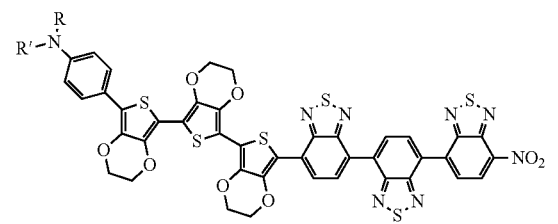
30
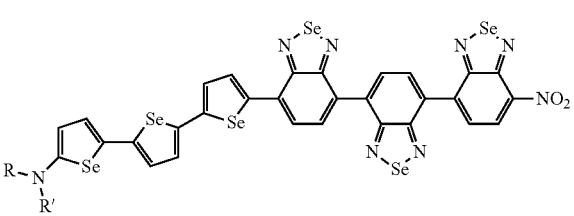

-continued

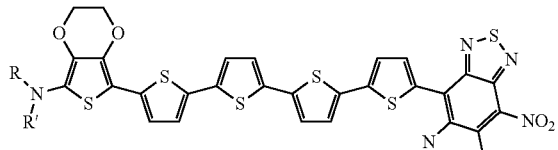

31

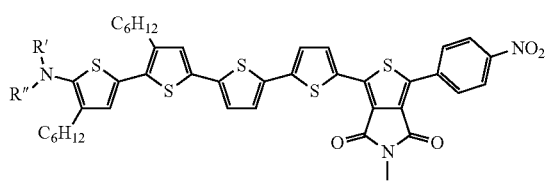

32

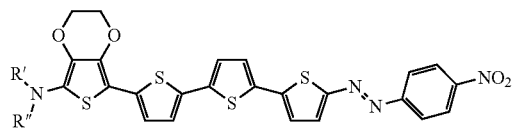

33

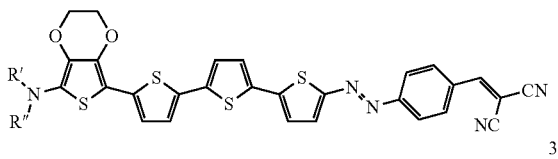

34

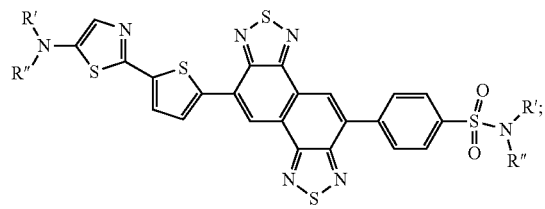

35 wherein R and R' present in the structures 1 to 35 can independently at all instances be any insulating resistive group;

D is independently selected from —O—, —C(O)O—, -Ak-O— or —C(O)OAk-, —NR—, —NH—R, —C(O)NH—, —C(O)NR, -Ak-NH—, Ak-NR—; wherein R is independently selected from hydrocarbon chains, halohydrocarbon chains, non-aromatic hydrocarbocycles, and non-aromatic heterocycles, which may be interrupted by hetero atoms; and wherein Ak is any substituted or unsubstituted alkyl which may be interrupted by hetero atoms;

Y is independently selected from O or NH or NAk, wherein Ak is any substituted or unsubstituted alkyl which may be interrupted by hetero atoms;

n is 0-300, and m is 1-300; and wherein at least one of Ak, R and Core includes an electron acceptor group selected from —NO$_2$, —CHO, —CR'O, —SO$_3$H, —SO$_3$R', SO$_2$NH$_2$, —SO$_2$NHR', —SO$_2$NR"R'", —COOH, —COOR', —CONH$_2$, —CONHR', —CONR"R'", —CF$_3$, —CCl$_3$, —CN, wherein R' and R" and R'" are radicals independently selected from hydrogen, alkyl, allyl, benzyl groups, optionally substituted phenyl and aryl groups.

5. A metadielectric film material comprising at least the material of claim 4 in the form of a film.

6. A metacapacitor comprising:
a first electrode,
a second electrode, and
a metadielectric film of the type set forth in claim 5 sandwiched between said first and second electrodes.

7. The metadielectric composite oligomeric organic material of claim 1, wherein the insulating resistive group is an alkyl, cycloalkyl, or aryl group.

8. The polymeric compound of claim 4, wherein the insulating resistive group is an alkyl, cycloalkyl, or aryl group.

* * * * *